Nov. 18, 1924.
R. I. McNAUGHTON
AUTOMOBILE HEADLIGHT
Filed Dec. 5, 1923
1,516,400
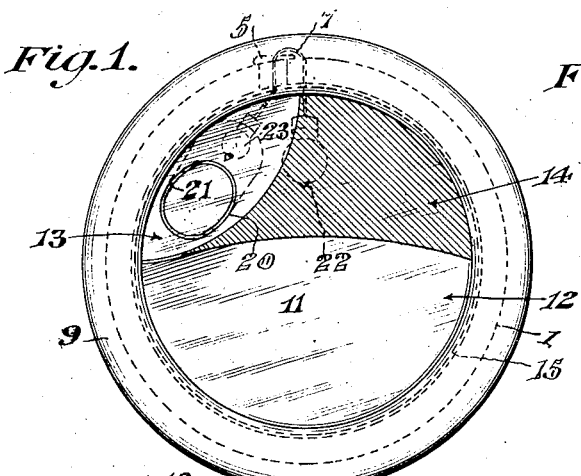
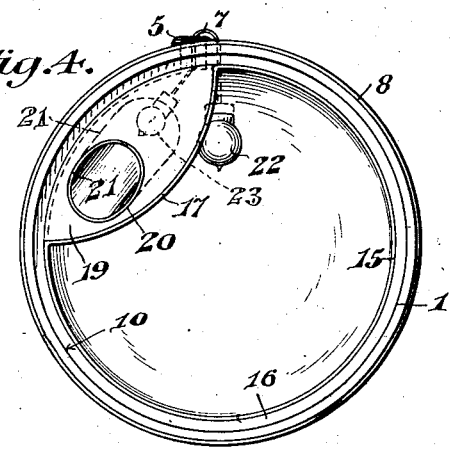
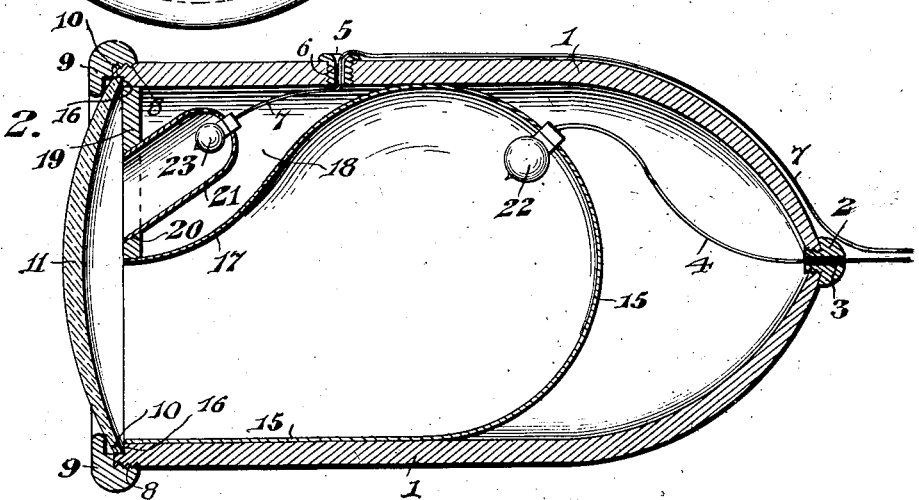
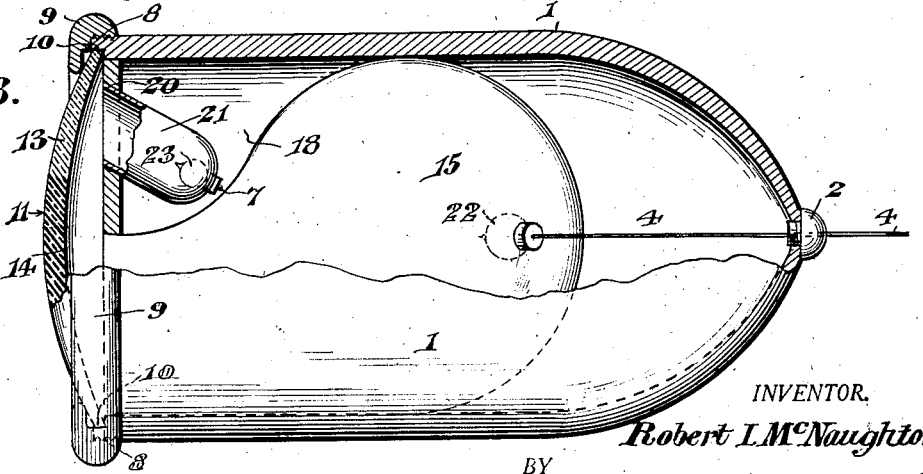
INVENTOR.
Robert I. McNaughton
BY
Geo. P. Kimmel
ATTORNEY.

Patented Nov. 18, 1924.

1,516,400

UNITED STATES PATENT OFFICE.

ROBERT I. McNAUGHTON, OF IRON MOUNTAIN, MICHIGAN.

AUTOMOBILE HEADLIGHT.

Application filed December 5, 1923. Serial No. 678,634.

*To all whom it may concern:*

Be it known that I, ROBERT I. MCNAUGHTON, a citizen of the United States, residing at Iron Mountain, in the county of Dickinson and State of Michigan, have invented certain new and useful Improvements in Automobile Headlights, of which the following is a specification.

This invention relates to headlights for motor vehicles, and has for its object to provide, in the manner as hereinafter set forth, a headlight having means for not only directing the light rays in a forward direction with respect to the vehicle and at the proper height to prevent a blinding effect upon the driver of an oncoming vehicle, but also to direct the light rays to the right of the roadway or vehicle when required.

A further object of the invention is to provide, in the manner as hereinafter set forth, a headlight having means for dimming the intensity of the rays directed therefrom, when occasion so requires, and further for directing the light rays to the right of the roadway so that the driver can notice any obstacle or obstruction when steering the vehicle upon the right side of the roadway, particularly when steering around an oncoming vehicle.

Further objects of the invention are to provide a headlight, in the manner as hereinafter set forth, which is simple in its construction and arrangement, strong, durable, compact, thoroughly efficient and convenient in its use, readily installed with respect to a motor vehicle, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a front elevation of a headlight in accordance with this invention.

Figure 2 is a longitudinal sectional view thereof.

Figure 3 is a sectional plan.

Figure 4 is a front elevation with the lens removed.

Referring to the drawings in detail, 1 denotes a casing of parabolic contour, which is open at its forward end and has its rear end centrally thereof, provided with a flanged peripherally threaded collar 2 fixedly secured within the said end and which provides a passage 3, for a circuit connection 4 which extends into the casing 1. The flanged collar 2 is constructed of insulation.

The top of the casing 1, at a point removed from its forward end, has secured therein a flanged peripherally threaded collar 5 which forms a passage 6 for a circuit connection 7. The collar 6 is constructed of insulation.

The periphery of the casing 1, at its forward end is provided with threads 8 with which engages an interiorly threaded inwardly extending lens holding rim 9.

The forward end of the casing 1, is cut away to provide a shoulder 10, against which is seated a concavo-convex lens 11, projecting forwardly from the casing 1 and engaged by the flange of the holding rim 9, for the purpose of maintaining the lens 11 in operative relation with respect to the forward end of the casing 1.

The lens 11 is circular in contour, and is formed of a light emitting portion 12 of semi-circular contour and which light emitting portion 12 is the lower half of the lens 11. The upper half of the lens 11 has a part thereof, as indicated at 13, forming a light emitting portion and which is elliptical in contour. The remaining part of the upper half of the lens 11 is opaque or what may be termed a no light emitting portion, as indicated at 14 and which is of greater area than the part 13.

Secured within the casing 1, in any suitable manner, is a reflector 15, which is of less length than the length of the casing 1, and said reflector 15 has its forward end registering with a ledge 16 arranged within the casing 1 at a point slightly removed from the forward end of said casing. The reflector 15 is somewhat of the parabola type, with this exception that the forward end of the reflector 15 has one side thereof inset, as indicated at 17 in Figure 4. The forward terminus of said inset portion is segmental in contour and said inset portion from its forward terminus is curved outwardly to extend to the inner face of the casing 1, as is shown in Figure 1. It may be stated that the space formed between the inset portion 17 of the reflector 15 and the inner face of the casing 1, is substantially elliptical in contour, and which provides in connection with the casing 1, a chamber 18 which gradually decreases in area from its forward towards its rear end. The forward end of the chamber 18 has arranged therein a support 19 which extends from the casing 1 to the reflector 15 at the forward end thereof, as shown in Figure 2, and the support 19 conforms in contour to the shape of the chamber 18. The support 19, is provided with a circular opening 20, having the wall thereof bevelled for the purpose of supporting a parabolic reflector 21 at a downward and outward inclination, in a manner as shown in Figures 2 and 3. The reflector 21 is arranged within the chamber 18.

Secured to the rear end of the reflector 15 and depending thereinto, is a lamp 22, to which the circuit connection 4 is attached, and secured to the rear end of the reflector 21 and extending forwardly therein, is a lamp 23 to which the circuit connection 7 is attached.

The shape of the reflector 15, at the forward end thereof, is such, that the light rays will be directed through the lower half of the lens 12 and that part of the reflector 15 which is arranged above the part 12 of the lens, opposes the opaque part 14 of the lens, so by this arrangement, the light rays directed by the reflector 15 will pass only through the lower half 12 of the lens 11, whereby the light rays will be directed forwardly of the vehicle and at such a height, as to prevent the possibility of said rays having a blinding effect on the driver of an oncoming vehicle.

The reflector 21 is so set up, that the light rays will be directed downwardly and to the right of the vehicle and upon the right side of the roadway, so that the driver of the vehicle can note any obstacles or obstructions which appear in his path when he is steering to the right or steering around an oncoming vehicle.

The circuit connections for the lamps can be such, that when the lamp 22 is illuminated, the lamp 23 will be extinguished, or the circuit connections may be such that the two lamps, that is to say the lamps 22 and 23 will be simultaneously illuminated. When a dimming operation is required, the connections would be such, as to extinguish the lamp 22 and illuminate the lamp 23.

When a right and left headlight are employed, the reflector 21 and lamp 23 will be positioned on the left side, in the left segment of the left headlight, and on the right side in the right segment of the right headlight. The result will then be to illuminate on the right and the left sides of the road bed.

A headlight, in accordance with this invention, when employed will overcome any blinding effect upon the driver of an oncoming car, will direct the light rays at a proper level with respect to the roadway and directly forward with respect to the vehicle, and furthermore the headlight is so set up as to direct light rays downwardly and to the right of the roadway to enable the driver of the vehicle to steer in a satisfactory manner when occasion so requires, and although the preferred embodiment of the invention is as illustrated and described, yet it is to be understood that changes in the details of construction can be had which will fall within the limits of the invention as claimed.

What I claim is:—

1. A headlight comprising a lens having its lower half formed of a light emitting part throughout and its upper half formed of a light emitting part and an opaque part of greater area than the light emitting part in said upper half, a casing, a reflector cooperating with said lower half of said lens and provided at its rear with an illuminating element and further positioned within said casing for projecting the light rays forwardly of the casing, said reflector having its forward portion at one side of its top inset, a downwardly extending and outwardly inclined reflector supported within said casing at one side of said inset portion and cooperating with the light emitting part of said upper half of the lens and provided with an illuminating element at the rear thereof, and circuit connections extending into said casing and leading to said illuminating elements.

2. A headlight comprising a lens having its lower half formed of a light emitting part and its upper half formed of a light emitting part and an opaque part, the light emitting part in the upper half of said lens being at one side thereof, a reflector for directing light rays forwardly cooperating solely with said lower half of said lens and provided with an illuminating element at the rear thereof and further having the forward portion thereof at one side of the top inset, a downwardly extending and outwardly inclined reflector arranged at one side of said inset portion and cooperating solely with the light emitting part of said upper half of the lens and provided with an illuminating element at the rear thereof, supporting means for said reflectors and lens, and circuit connections for said illuminating elements.

In testimony whereof, I affix my signature hereto.

ROBERT I. McNAUGHTON.